(12) United States Patent
Koshinsky et al.

(10) Patent No.: US 12,102,249 B2
(45) Date of Patent: Oct. 1, 2024

(54) DEVICES FOR SUPPLYING FLUIDS TO CUT PLANT HOLDERS

(71) Applicant: LevGo, Inc., Berkeley, CA (US)

(72) Inventors: Heather Koshinsky, El Cerrito, CA (US); Margret Leventhal, Berkeley, CA (US); Kent McCue, Berkeley, CA (US); Alexander Hunt, Berkeley, CA (US)

(73) Assignee: LevGo, Inc., Berkeley, CA (US)

( * ) Notice: Subject to any disclaimer, the term of this patent is extended or adjusted under 35 U.S.C. 154(b) by 226 days.

(21) Appl. No.: 17/514,843

(22) Filed: Oct. 29, 2021

(65) Prior Publication Data

US 2022/0133071 A1 May 5, 2022

Related U.S. Application Data

(60) Provisional application No. 63/107,789, filed on Oct. 30, 2020.

(51) Int. Cl.
*A47G 33/12* (2006.01)

(52) U.S. Cl.
CPC ...... *A47G 33/12* (2013.01); *A47G 2033/1293* (2013.01)

(58) Field of Classification Search
CPC ............ A47G 32/12; A47G 2033/1286; A47G 2033/1293
See application file for complete search history.

(56) References Cited

U.S. PATENT DOCUMENTS

| 3,697,026 | A | * | 10/1972 | Hambrick | A47G 33/12 248/524 |
| 4,653,224 | A | * | 3/1987 | Weckesser | A47G 33/12 47/79 |
| 5,157,868 | A | * | 10/1992 | Munoz | A01G 27/005 47/79 |
| 5,369,910 | A | * | 12/1994 | Copenhaver | A47G 33/12 248/188.4 |
| 5,575,110 | A | * | 11/1996 | Couture | A47G 33/12 47/40.5 |
| 5,791,082 | A | * | 8/1998 | Finello | A01G 27/005 220/571 |
| 5,857,484 | A | * | 1/1999 | Davidian | A01K 7/02 137/454 |
| 6,260,303 | B1 | * | 7/2001 | Sappenfield | A01G 27/005 47/40.5 |

(Continued)

*Primary Examiner* — Kristen C Hayes
(74) *Attorney, Agent, or Firm* — BakerHostetler

(57) ABSTRACT

A device is provided for supplying a fluid to a cut plant. The device includes a container comprising a base and a surrounding wall extending from the base to define an enclosed space or cavity for holding the fluid. The device also includes a connector coupled to the container. The device further includes a flexible tube coupled to the connector at a first end and having a jagged open end, wherein the connector enables a fluid communication between the container and the flexible tube. A system is provided that includes such a device, a holder for the cut plant, and a fastener to secure the flexible tube to the holder. The flexible tube extends into the holder to allow the fluid to flow from the container to the holder, such that a fluid level in the container is the same as a fluid level in the holder.

67 Claims, 10 Drawing Sheets

(56) References Cited

U.S. PATENT DOCUMENTS

| | | | | |
|---|---|---|---|---|
| 6,497,071 | B1* | 12/2002 | Main | A47G 33/12 47/79 |
| 7,367,157 | B1* | 5/2008 | Doan | A47G 33/12 119/51.5 |
| 7,681,354 | B2* | 3/2010 | Shepardson | A01G 27/005 47/40.5 |
| 11,172,779 | B1* | 11/2021 | Munoz | A47G 33/12 |
| 2002/0108301 | A1* | 8/2002 | Tasker | A01G 27/005 47/40.5 |

* cited by examiner

DEVICES FOR SUPPLYING FLUIDS TO CUT PLANT HOLDERS

CROSS-REFERENCE TO RELATED PATENT APPLICATION

This patent application claims the benefit under 35 U.S.C. § 119(e) of U.S. Patent Application Ser. No. 63/107,789, entitled "Devices for Supplying Fluids to Cut Plant Holders," filed on Oct. 30, 2020, which is incorporated herein by reference in its entirety.

FIELD

The disclosure is directed to a device including a container maintaining a fluid level and supplying the fluid into another fluid container, such as a holder for a fresh cut plant.

BACKGROUND

Holders for cut plants can be used to supply water to the cut plants. One example is the holder for a cut or live Christmas tree. The holder is also referred to as a Christmas tree stand. Many fresh Christmas trees can consume more than a quart of water in less than 24 hours.

It is difficult to keep water in a holder for cut plants or a cut plant holder. First, many cut plant holders (e.g., conventional Christmas tree stands) are disproportionately small compared to the Christmas trees. The conventional Christmas tree stands include limited small space for fluid addition. Second, the conventional Christmas tree stand includes an inconvenient location for adding water. For example, water must be brought under the Christmas tree. For further example, the tree takes up a great deal of the space in the stand and the opening to add water can be small and can be inconveniently located. Due to being disproportionally small and the necessarily inconvenient location of the stand, there is a risk that the Christmas tree can tip over or can be moved to a less pleasing vertical position when water is added to the stand. Also, there is risk that water is spilled or overflows onto the floor. Further, cut plants, such as a Christmas tree, quickly consume the water that is available in the holder, and thus require frequent checking to determine if there is sufficient water in the stand and adding water to the stand. The stand is normally nontransparent. One may use a finger in the stand to determine when the stand is filled with enough water. The frequency and inconvenience of checking and adding water can be particularly problematic during the busy Christmas season.

When water is insufficient in the Christmas tree stand, the bottom of the cut plant is not in contact with the fluid. When the bottom of a cut Christmas tree loses contact with the water in the stand, air can get into and block the stem and needles of the Christmas tree can dry out. These dry needles are prone to falling off the tree and making a mess and may also increase a fire risk.

For cut flowers or small greeneries, air in stems of the cut flowers can be remedied by removing the cut flowers from a vase, then shortening the bottoms of the cut flowers to have fresh cut bottoms, followed by placing the flowers having the fresh cut bottoms back into the vase. However, it is not practical to remove a Christmas tree from a Christmas tree stand, and to cut a fresh bottom from a trunk of the Christmas tree and put the Christmas tree back in the stand.

There remains a need for developing a device for supplying fluid to a cut plant to solve the problems of the conventional holders.

BRIEF SUMMARY

A device is provided for supplying a fluid to a cut plant.

In a first aspect, the device includes a container comprising a base and a surrounding wall extending from the base to define an enclosed space or cavity for holding the fluid. The device also includes a connector coupled to the container. The device further includes a flexible tube coupled to the connector, wherein the connector enables a fluid communication between the container and the flexible tube.

In a second aspect, a system includes the device, a holder for the cut plant, and a twist tie to secure the flexible tube to the holder or to the cut plant. The holder and the container are placed on a same level of a flat surface. The flexible tube extends downwardly into the holder to allow the fluid to flow from the container to the holder, such that a fluid level in the container is the same as a fluid level in the holder.

In a third aspect, a method is provided for supplying fluid to a cut plant in a holder. The method may include placing a container and a holder containing the cut plant on a flat surface. The method may also include extending a flexible tube from a sidewall of the container into the holder to a position below the bottom of the cut plant. The method may also include facilitating a fluid flow from the container to the holder through the flexible tube. The method may further include maintaining a fluid level in the holder to be the same as a fluid level in the container.

In a fourth aspect, a container is provided for supplying a fluid to a cut plant. The container comprises a base and a surrounding wall extending from the base to define an enclosed space or cavity for holding the fluid. At least a portion of the base defines a lower edge configured to support the container on a surface. The device also includes a connector coupled to and extending through the surrounding wall. The connector is spaced apart from the lower edge.

In a fifth aspect, a device is provided for supplying a fluid to a cut plant. The device includes a container comprising a base and a surrounding wall extending from the base to define an enclosed space or cavity for holding the fluid. The device also includes a connector coupled to the container. The device further includes a flexible tube coupled to the connector at a first end and having a jagged open second end, wherein the connector enables a fluid communication between the container and the flexible tube.

In a sixth aspect, a system includes the device and a flexible fastener to secure the flexible tube. The holder and the container are placed on a same level of a flat surface. The flexible tube extends downwardly into the holder to allow the fluid to flow from the container to the holder, such that a fluid level in the container is the same as a fluid level in the holder.

In a seventh aspect, a system includes the device, a holder for the cut plant, and a flexible fastener to secure the flexible tube to the holder or to the cut plant. The holder and the container are placed on a same level of a flat surface. The flexible tube extends downwardly into the holder to allow the fluid to flow from the container to the holder, such that a fluid level in the container is the same as a fluid level in the holder.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

The disclosure provides a device including a container and a flexible tube connected to the container. The flexible tube extends from the container to a holder for a cut plant, and terminates near the bottom of the holder. The device does not have any electric parts or moving parts.

Figure 1A:
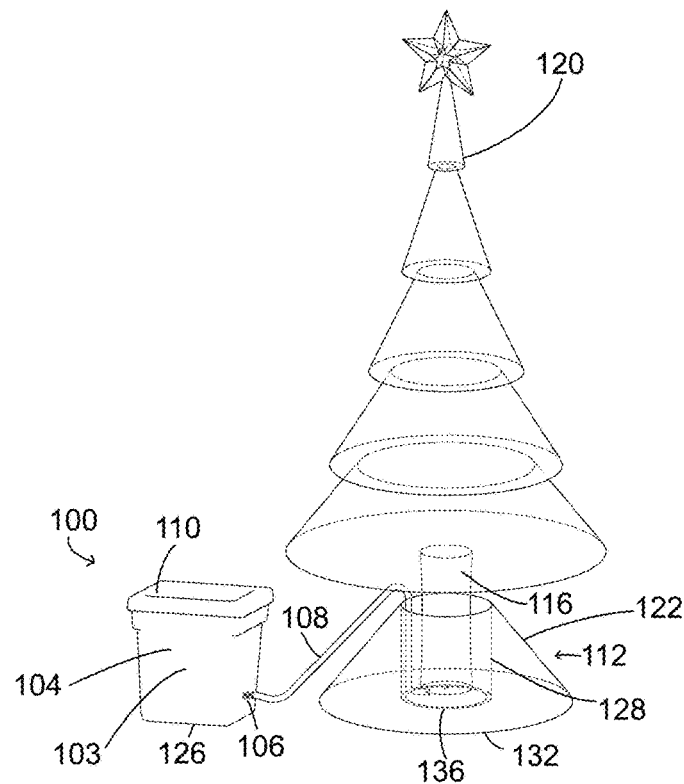
FIG. 1A illustrates a perspective of a device including a container coupled to a flexible tube by a connector for supplying fluid (e.g. water) to a Christmas tree stand, in accordance with an illustrative embodiment.
Figure 1B:
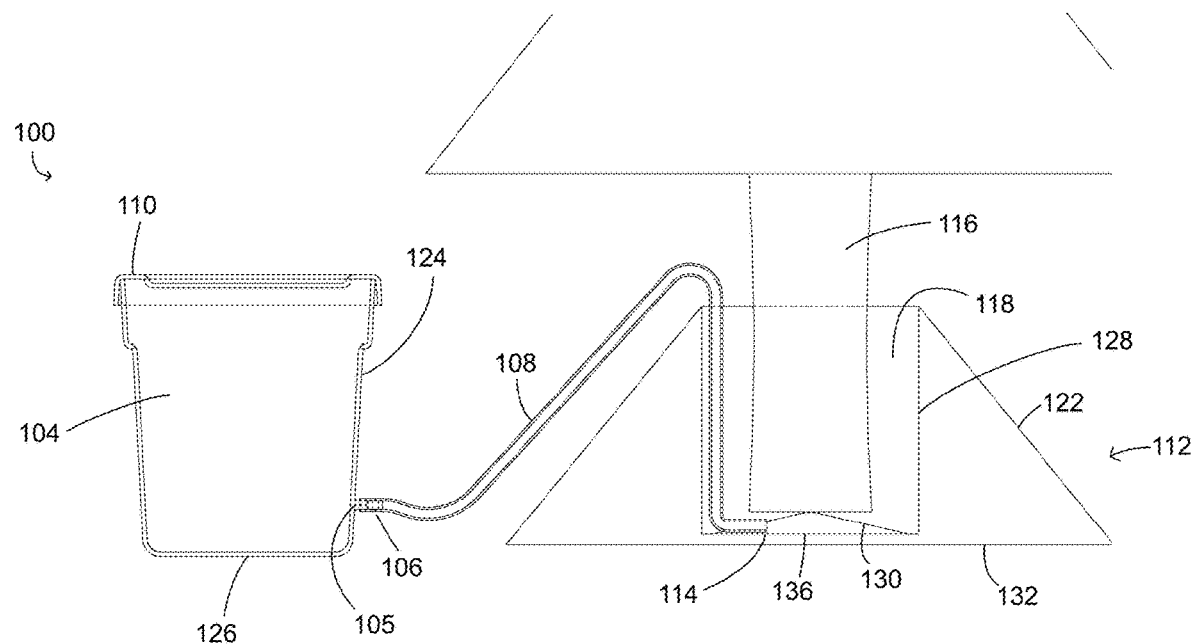
FIG. 1B is a side view of the device of FIG. 1A for watering the Christmas tree of FIG. 1A, in accordance with an illustrative embodiment.

FIG. 1A illustrates a perspective of a device including a container coupled to a flexible tube by a connector for supplying water to a cut plant (e.g., a Christmas tree stand) in accordance with an embodiment of the disclosure. FIG. 1B is a side view of the device of FIG. 1A for supplying water to the Christmas tree stand of FIG. 1A in accordance with an embodiment of the disclosure. As shown, a device 100 includes a container 104 that can hold fluid, such as water. The device 100 also includes a flexible tube 108 which couples to the container 104 by a connector 106. The device 100 can assist in watering a cut plant 120 and serves as a water reservoir for supplying water to the cut plant 120. The cut plant 120 may include a tree trunk 116 which is placed inside a tree stand or plant holder 112. The plant holder 112 may include an outer wall 122, an inner wall 128, and a bottom surface 132 connected to the outer wall. As shown, a central element 130 for supporting the tree trunk 116 may be angled from the inside bottom surface 136. When the tree trunk 116 is placed inside the plant holder 112, space 118 between the trunk 116 and the inner wall 128 can store water to supply to the cut plant 120.

As shown, the flexible tube 108 may be inserted into the space 118 and extending downwardly and then extending horizontally. In some variations, the flexible tube may extend downwardly without extending horizontally.

The flexible tube 108 may have a jagged open end 114, which may allow water to flow from the container 104 to the space 118 inside the plant holder 112. The jagged open end may assist in keeping debris from clogging the open end. The jagged open end 114 may resist blockage by plant debris and other solids that can hamper the water flow from the container to the holder. The jagged open end 114 may prevent blockage of the flexible tube when it comes in contact with a flat surface, such as an inner wall 128 or bottom surface 136 of a holder. For example, the jagged open end 114 of the flexible tube 108 may prevent debris or other objects from being suctioned flat against the open end 114 of the flexible tube 108, which could disadvantageously hamper water flow from the container to the holder. As used herein, the term "jagged" with respect to the open end 114 of the flexible tube 108 refers to a notched, undulating, or otherwise non-flat, non-planar, and/or non-smooth (rough) surface of the open end.

The flexible tube 108 may be attached to the plant holder. For example, the flexible tube may be attached to the holder or attached to a portion of a plant in the holder by using a portion of flexible plastic-coated wire 420. Many other methods of attachment are envisioned and may be implemented, as desired, to suit a particular application.

The principle of operation of the device is to maintain the fluid level in the plant holder the same as the fluid level in the container. The container can be refilled with more fluid, as necessary, to maintain a desired fluid level in the plant holder.

It will be appreciated by those skilled in the art that the cut plant may also include a plant used at weddings, stage plays, galas, motion picture sets, among other events.

Container

Referring to FIGS. 1A-1B again, according to one variation, the container 104 includes a bottom or base 126 and a surrounding wall 124 extending upwardly from the bottom 126. A cavity or space 103 is enclosed by the surrounding wall 124 and the bottom 126. The cavity or space 103 can contain fluid. The surrounding wall 124 may be slanted or it may be orthogonally angled from the bottom 126. In some variations, the surrounding wall 124 may also be perpendicular to the bottom 126. In some variations, the surrounding wall 124 can have various shapes, including a square shape, a rectangular shape, or a cylindrical shape.

The bottom 126 may have a flat surface. In some variations, the bottom or base 126 may include legs (not shown) that can sit on a flat surface, such as a floor, table, countertop, or ledge among others.

The container 104 may optionally include a lid 110 covering a top edge of the surrounding wall 124. The lid 110 can reduce the likelihood of fluid spilling or items falling into the container, such as extension cords, Christmas tree lights, children, and/or pets.

The optional lid 110 may be hinged or have a partial opening, such that the entire lid does not need to be removed for fluid to be added to the container 104.

In some variations, the lid may be colored, or not colored. The lid can be translucent, not translucent, opaque, or not opaque, or a solid color.

In some variations, the container may be optically translucent, semi-transparent, or opaque, such that the fluid level can be visible from outside.

In some variations, the container can be colored. The container can have a window portion that allows the fluid level in the container to be visible.

In some variations, the container may include marks that can indicate upper and lower limits for fluid levels in the container.

In some variations, the container may include a feature that assists in lifting the container, which can be an external feature or an integrated feature into the container. The feature may be placed on one of the locations including sides, top, or corners, of the container. This feature may be a handle. This feature may be a lip on the container.

In some variations, the container can be used to store the flexible tube and other items, when not in use.

The container can be refilled to a desired level after removing the lid.

The container or lid may include a small hole to prevent an airtight seal in the container such that the air pressure stays the same as the outside, or an atmospheric pressure. In some variations, the lid can be opened frequently to keep the pressure inside the container to be the same as an atmospheric pressure.

In some variations, the container may be formed of plastic. The plastic container may have a wall thickness ranging from 0.03 inches to 0.2 inches. In some variations, the wall thickness may range from 0.04 inches to 0.14 inches.

In some variations, the container may be formed of glass. The glass container may have a wall thickness up to 1.6 inches.

In some variations, the container may be formed of metal. The metal container may have a wall thickness of 0.2 inches or less.

In some variations, the container may have a height between 3 inches and 10 inches.

In some variations, the container may hold fluid between 0.25 gallons and 5.0 gallons.

In some variations, plant preservatives may be added to water in the container.

In some variations, antimicrobial agents may be added to the water in the container.

The container may include an opening 105 on the surrounding wall 124 near the bottom or base 126. The opening 105 may be configured to receive at least a portion of the connector 106 therein or therethrough. In variations, the opening 105 and the connector 106 may be integrally formed.

In some variations, the opening may have a diameter from $2/10$ inches to 1 inch. In a particular embodiment, the diameter of the opening is $3/8$ inches. The opening may be configured for flexible tube having an inner diameter of $3/16$ inches and an outer diameter of $5/16$ inches.

In some variations, the connector 106 may be an integrated part of the container and cannot be detached. In this embodiment, the opening may have a diameter of about $1/16$ inches to $3/8$ inches when the container is formed of a plastic. The opening may have a diameter larger than $1/8$ inches when the container is formed of a glass.

Turning to FIGS. 7A-7D, a container according to another variation is illustrated. The container 704 includes a bottom or base 726 and a surrounding wall 724 extending upwardly from the base 726. A cavity or space 703 is enclosed by the surrounding wall 724 and the base 726. The cavity or space 703 can contain fluid. The surrounding wall 724 may be slanted or it may be orthogonally angled from the base 726. In some variations, the surrounding wall 724 may also be perpendicular to the base 726. In some variations, the surrounding wall 724 can have various shapes, including a square shape, a rectangular shape, or a cylindrical shape.

Figure 7A:
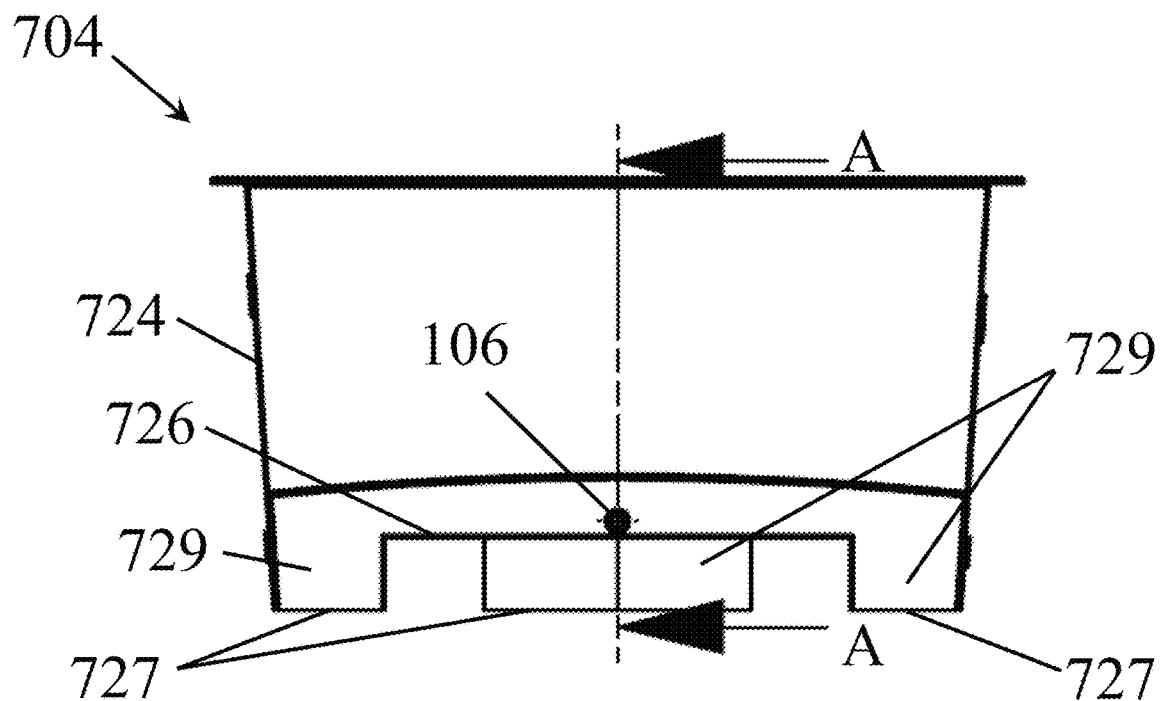
FIG. 7A illustrates a front view of a container, in accordance with an illustrative embodiment.
Figure 7B:
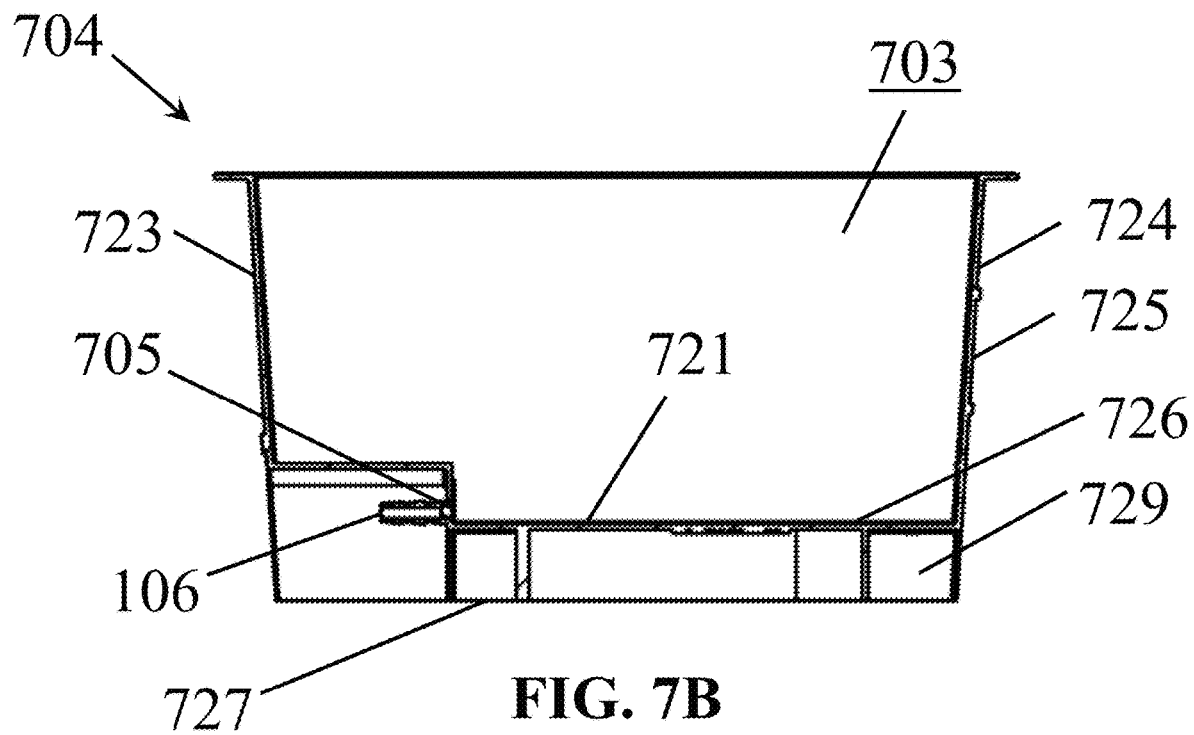
FIG. 7B illustrates a sectional view of the container of FIG. 7A along line A-A of FIG. 7A, in accordance with an illustrative embodiment.
Figure 7C:
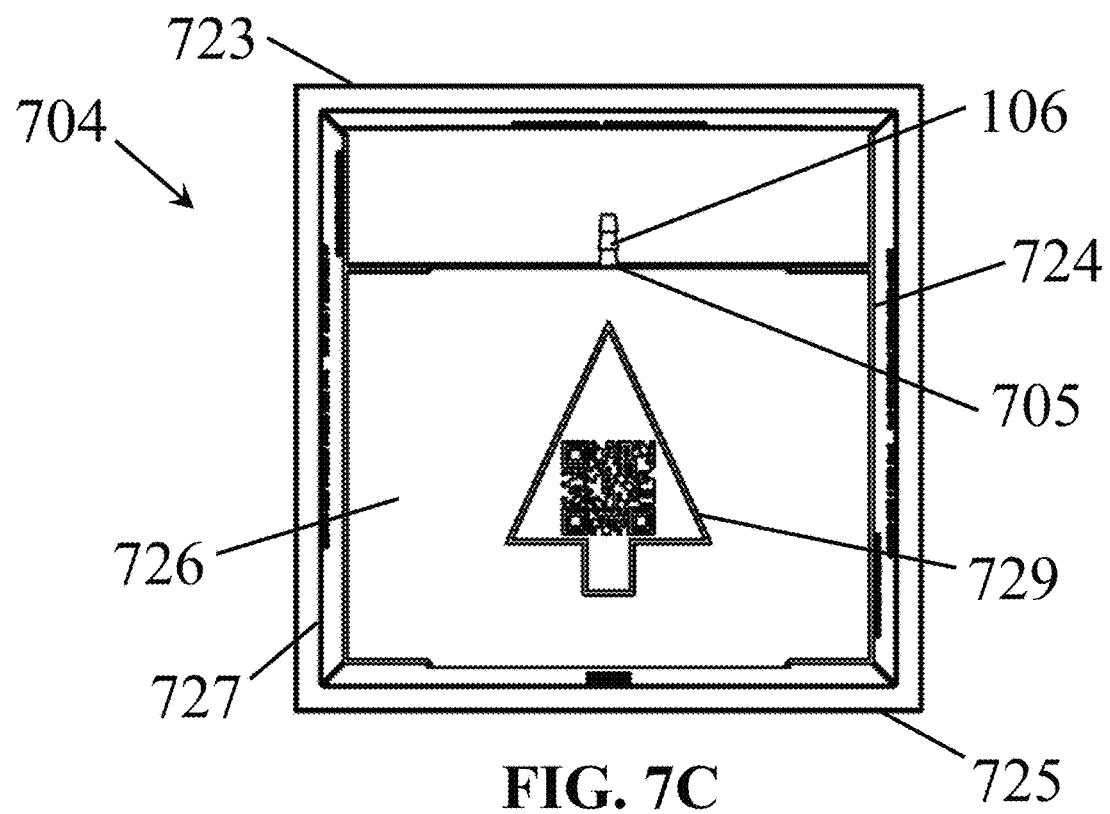
FIG. 7C illustrates a bottom view of the container of FIG. 7A, in accordance with an illustrative embodiment.
Figure 7D:
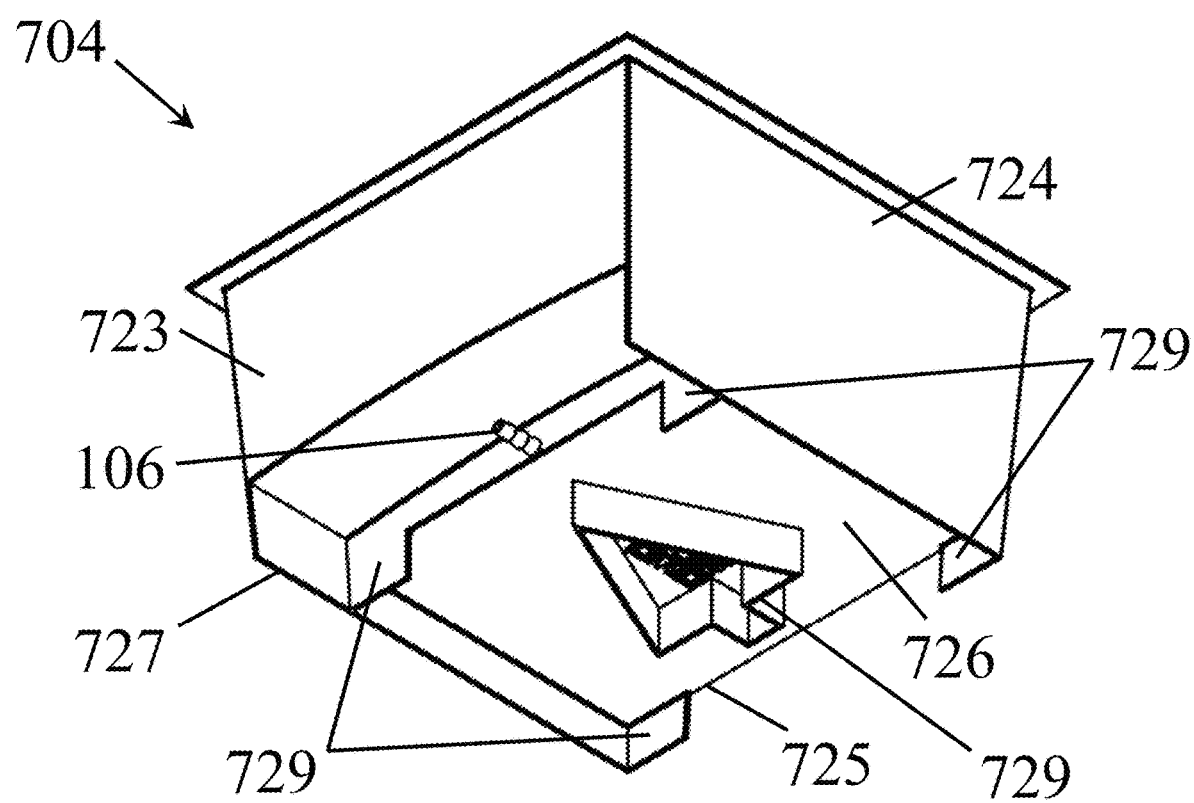
FIG. 7D illustrates a bottom perspective view of the container of FIG. 7A, in accordance with an illustrative embodiment.

The base 726 may have a flat surface. At least a portion of the base 726 may define a lower edge 727. The lower edge 727 may support the container 704 on a flat surface, such as a floor, table, countertop, or ledge among others. In some variations, the bottom or base 726 may include legs 729 that can sit on a flat surface, such as a floor, table, countertop, or ledge among others. In such variations, one or more of the legs 729 may define the lower edge 727. In variations, one of the legs 729 may be positioned substantially centrally with respect to the bottom or base 726. In some variations, one or more of the legs 729 may define a Christmas tree shape (such as is illustrated in FIGS. 7C and 7D).

The base 726 may define an interior surface 721. The interior surface 721 of the base 726 may generally define a lower boundary of the cavity or space 703 enclosed by the surrounding wall 724 and the base 726. The interior surface 721 may, in variations, be tapered or angled. In variations, the interior surface 721 may, in variations, be tapered or angled in a direction toward connector 106, such that fluid within the container 704 is urged toward the connector 106. The tapering or angling of the interior surface 721 may be from about 1° to 45° or less. In variations, the tapering or angling of the interior surface 721 may be about 1.5°.

The container 704 may optionally include a lid (not shown) covering a top edge of the surrounding wall 724. The lid can reduce the likelihood of fluid spilling or items falling into the container, such as extension cords, Christmas tree lights, children, and/or pets (including the ability for a child and/or pet to access the cavity of the container or drink from the container). The optional lid may be hinged or have a partial opening, such that the entire lid does not need to be removed for fluid to be added to the container 704.

The container may include an opening 705 on the surrounding wall 724 near the bottom or base 726. The opening 705 may be configured to receive at least a portion of the connector 106 therein or therethrough. In variations, the opening 105 and the connector 106 may be integrally formed.

The container 704 may include a QR code. In some variations, the QR code may be printed on a sticker placed on the container 104. In other variations, the QR code may be embedded within the container 704 (e.g., as part of a plastic container). In other variations the QR code may be associated with a lid of a container. The QR code may, when scanned, provide information for installing, using, troubleshooting, reordering the device, and/or other digital links.

Connector to the Container

The connector 106 is coupled to the opening of the container and connects between the flexible tube 108 and the container. The connector enables a fluid communication between the container and the flexible tube and may prevent fluid leaking.

To further prevent leaking, a tape, such as Teflon tape, may be used between the connector and the container. Alternatively, a glue or adhesive may be used between the connector and the container. Alternatively, a sealant or silicone maybe be used between the connector and the container. Alternatively, a washer and nut may be used to secure the connector to the container.

Figure 2A:
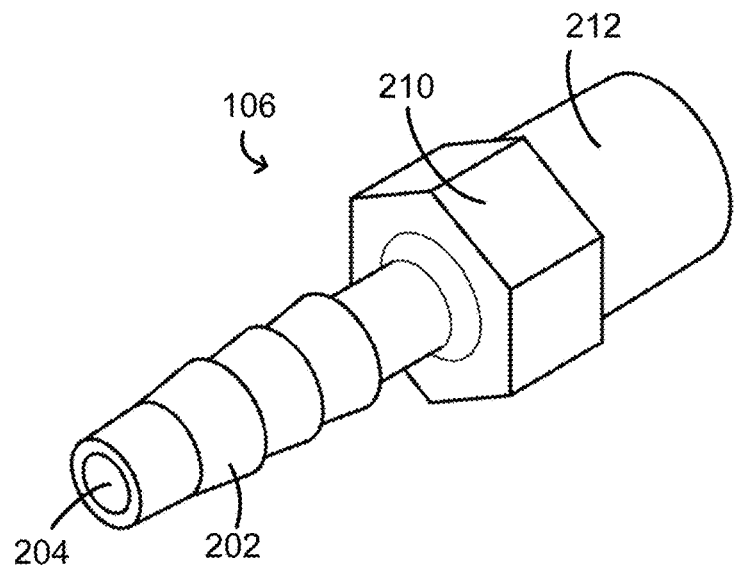
FIG. 2A is a perspective view of a connector, in accordance with an illustrative embodiment.
Figure 2B:
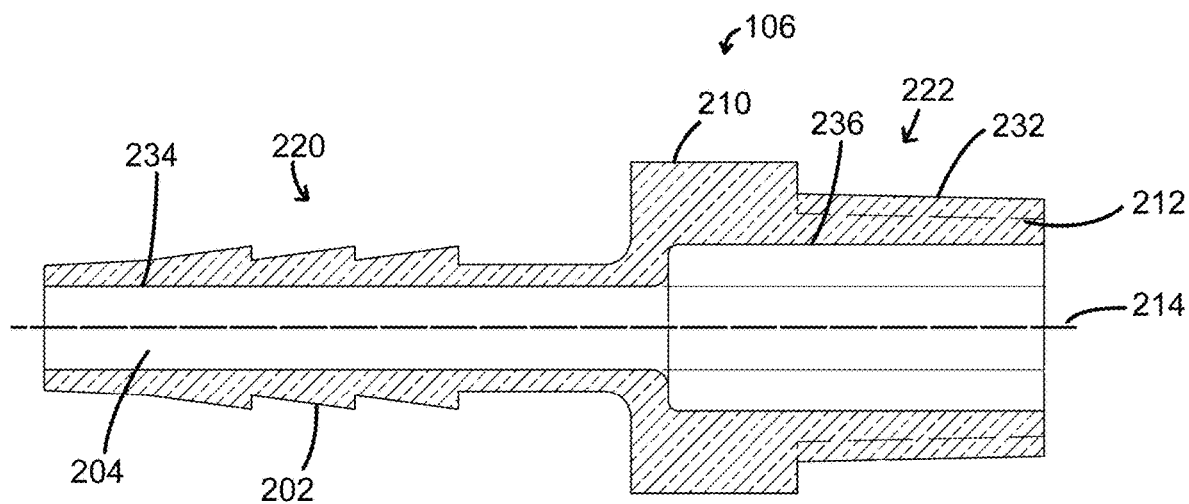
FIG. 2B is a cross-sectional view of the connector of FIG. 2A, in accordance with an illustrative embodiment.

FIG. 2A is a perspective view of the connector of the device of FIG. 1A in accordance with an embodiment of the disclosure. FIG. 2B is a cross-sectional view of the connector of FIG. 2A in accordance with an embodiment of the disclosure. As shown, the connector 106 may include a first end 220 having a barbed fitting or an outer wall 202 having a first diameter (e.g., measured at the widest portion of the outer wall 202) and an inner wall 234 having a second diameter. A cylindrical cavity 204 may be enclosed inside the inner wall 234 of the first end 220. The first end 220 may be configured to connect to an open end of flexible tube 108. For example, the open end of the flexible tube can be pushed onto the barbed fitting 202 of the first end 220 such that the connector may be at least partially received within the open end of the flexible tube.

The connector 106 may also have a second end 222 opposite to the first end 220. The second end 222 may include an end outer portion 232 having a third diameter and an inner wall 236 having a fourth diameter, which may be different or larger than the second diameter of the inner wall 234. Also, a cylindrical cavity 214 may be enclosed inside the inner wall 236 of the second end 222. The cylindrical cavities 204 and 214 may be connected to form a fluid channel and allow the fluid to flow between the second end 222 and the first end 220. A direction that the fluid can flow between the second end 222 and the first end 220 is from the container through the connector and the flexible tube to the holder for a cut plant. Fluid can also flow in a direction (e.g., an opposite direction) from the holder for the cut plant, through the flexible tubing, through the connector, and into the container.

The connector 106 may also include an enlarged portion 210 between the first end 220 and the second end 222. The enlarged portion 210 may have a 6 sided hex shape and may have a larger outer dimension than the third diameter of the end outer portion 232 and can stop against the surrounding wall or side wall of the container.

In some variations, the connector may be a separate component attached to the container. The flexible tube and the connector can be removed from the container. The ability to attach and remove the connector from the container may decrease the possibility of breakage during shipping and storage. The ability to add and remove the connector from the container may also allow stacking of multiple containers for storage purposes.

The end outer portion 232 may be threaded down to line 212. The container can have an opening 105 configured for the end outer portion 232 to be fastened to the container. In some variations, this opening 105 may be tapped. In this case, the connector may be a component which can be made separately from the container. The optional enlarged portion 210 can be tightened against the side wall 124 of the container, for example, by using a wrench. Also, a tape, such as a Teflon tape, may be used to wrap the outer portion 232 and then the connector is screwed into the opening of the container. The tape may help reduce fluid leakage at the connector when fluid flows from the container 104 to the plant holder 112.

In some variations, there is no second end 222 and the first end 220 is integrated with the container. The connector may be an integral part of the container. For example, the connector may be formed with the container when the production volume is high enough or when custom containers are created. In some variations, the opening of the connector may have a diameter ranging from 0.1 inches to 0.8 inches. The opening may also vary with the type of material for the container, such as plastic or glass.

In some variations, the barb fitting 202 may have at least 1 barb. In some variations, the barb fitting 202 may have 2 barbs. In some variations, the barb fitting 202 may have 3 barbs or more.

As shown in FIG. 2B, example dimensions are provided. By way of non-limiting example, the connector 106 may have a length of 1.50 inches, a 3/16 inches tube connection, and/or a flow diameter of 0.13 inches. By way of non-limiting example, the barbed fitting may have an outer diameter of 0.25 inches. The connector may also include 7/16 HEX and 1/8-27 NPT. Connectors with fewer barbs and shorter or longer first 220 and second 232 ends are envisioned.

In some variations, a center of the opening for the connector may be 0.1 to 2.0 inches above the base of the container. In other words, the connector 106 may be located at a position between 0.1 inches and 2.0 inches above the bottom 126 or base of the container 104. The fluid level in the container should be above the connector such that air would not be trapped in the flexible tube, which may affect the fluid flow.

The connector 106 may include a spigot or fluid flow control mechanism between the container and the flexible tube end.

The connector may be made of one or more materials, which does not rust, for example, plastic, glass or rust proof metal.

As will be readily appreciated by those skilled in the art, the connector 106 may be coupled to either container 104 of FIGS. 1A-1B or container 704 of FIGS. 7A-7D. In variations, the connector 106 may be formed integrally with of container 104 of FIGS. 1A-1B or container 704 of FIGS. 7A-7D.

In variations, the connector 106 may be positioned so as to be generally flush with the surrounding wall or side wall of the container (e.g., such that the outward portion of the connector is generally flush with the outer face of the surrounding wall of the container) or may extend outwardly from or be recessed relative to the surrounding wall or side wall of the container (e.g., such that the connector is recessed from the outer face of the surrounding wall of the container). For example, in one variation illustrated in FIGS. 7A-7D, the connector 106 may be spaced apart from the forward end 723 of the surrounding wall 724 of the container 704. In this variation, the connector 106 is positioned between the forward end 723 and the rear end 725 of the surrounding wall 724 of the container 704. In this variation, the connector 106 is coupled to and extends through the surrounding wall 724 between the forward end 723 and the read end 725 of the surrounding wall 724. In this variation, the connector 106 may be positioned within a cutaway or recessed portion of the container 704. Such positioning of the connector 106 may decrease the possibility of breakage during shipping and storage, protect the tubing and connector by reducing possible stresses acting thereupon, and/or maximize the ratio of the amount of useful fluid compared to shipping volume by lessening or minimizing the required shipping volume necessitated by a connector that projected outwardly from an outer wall of the container and needs to be protected during shipping.

Flexible Tube

The flexible tube 108 may have an open end attached to the container 104 to allow fluid (e.g. water) to flow out of the container 104. The flexible tube 108 may have a jagged open end extending into the holder 112 near the bottom surface 136 of the holder 112. The flexible tube 108 can have sufficient structural rigidity to prevent and/or retard kinking and collapsing during use. The flexible tube 108 can be attached to the container 104 in a manner that reduces accidental disconnection of the flexible tube from the container. The flexible tube 108 may be long enough to allow the container 104 to be located in an easy access location away from the plant holder 112.

Figure 3A:
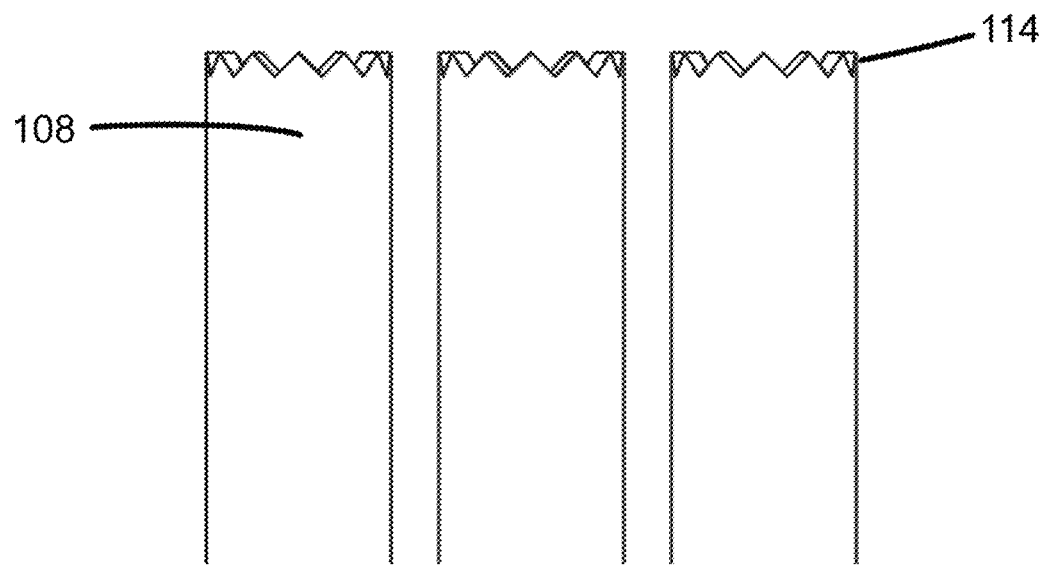
FIG. 3A is a side view of a jagged open end of the flexible tube of FIG. 1A, in accordance with an illustrative embodiment.
Figure 3B:
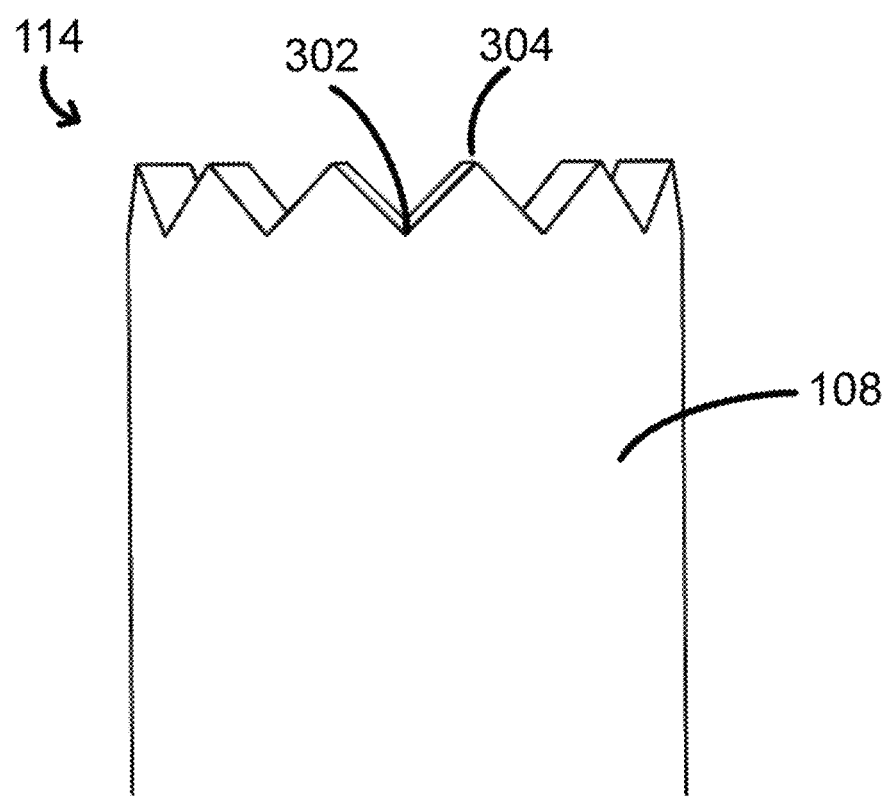
FIG. 3B is an image of the jagged open end of the flexible tube of FIG. 1A, in accordance with an illustrative embodiment.

FIG. 3A is a side view of a jagged open end of the tube of FIG. 1A in accordance with an embodiment of the disclosure. As shown in FIG. 3B, the jagged open end 114 may look like saw teeth, including peaks 304 connected to valleys 302. In other words, the end surface is rough or non-flat. FIG. 3B is an image of the jagged open end 114 of the flexible tube 108 according to one variation. The jagged open end 114 of the flexible tube 108 in the plant holder 112 may help reduce blockage caused by debris in the plant holder 112. The jagged open end 114 may also help prevent the flexible tube from fully contacting with the bottom of the plant holder and/or being suctioned against the bottom of the plant holder, thereby preventing fluid flow. The jagged open end 114 may also help prevent the flexible tube from fully contacting an inside wall of the plant holder 128 and/or being suctioned against the bottom, side, or any other surface of the plant holder or of a plant, thereby preventing fluid flow. In some variations, the jagged open end 114 of the flexible tube may be bent to extend horizontally as shown in FIG. 1B. In some variations, the jagged open end may be less jagged and instead have rounded peaks and valleys. Other embodiments are envisioned so long as the end is not flat. By way of non-limited example, in other variations, the jagged open end 114 may look like notches, undulations, or other non-flat, non-planar, and/or non-smooth surfaces.

In some variations, the flexible tube may be translucent such that the fluid flow in the flexible tube is visible.

In some variations, the flexible tube may be opaque.

In some variations, the length of the flexible tube may vary between 1.5 and 6.0 feet.

In some variations, the flexible tube may have an inner diameter between 1/16 and 1/2 inches.

In some variations, the flexible tube may have an inner diameter being at least equal to or greater than 0.125 inches.

In some variations, the flexible tube wall may have a thickness between 1/32 and 1/8 inches.

In some variations, there is a device that secures the flexible tube to the holder in a manner that does not impede fluid flow through the flexible tube.

In some variations, there is a device that secures the flexible tube to a cut plant in the holder in a manner that does not impede fluid flow through the flexible tube.

As will be readily appreciated by those skilled in the art, the flexible tube 108 may facilitate fluid communication between plant holder 112 and either container 104 of FIGS. 1A-1B or container 704 of FIGS. 7A-7D.

Operation Principles

A method of supplying water to a cut plant in a holder by using the disclosed device and/or the disclosed container may include placing the container and the holder for the cut plant on a floor. The method may also include extending a jagged open end of the flexible tube downwardly in the holder to be below a bottom of a cut plant. The method may also include facilitating water flow from the container to the holder through the flexible tube. The method may further include maintaining the water level in the holder to be the same as the water level in the container.

The method may also include filling water in the container up to an upper mark on the container, where the upper mark may be below side holes of the holder or other fluid exit points defined in the holder. For example, the user may mark the container with the upper mark such that the upper mark is at or below the lowest fluid exit point defined in the holder. The method may also include monitoring the water level in the container and adding water to maintain the water above a lower mark on the container. The lower mark may be above an opening on a side wall of the container, wherein the flexible tube is connected to an opening of the container either directly or with a connector. For example, the user may mark the container with the lower mark such that the lower mark is at or above the lowest point of the cut plant (e.g., the bottom of a Christmas tree that is positioned above the bottom of the stand, such as is illustrated in FIG. 1B). The method may also include securing the flexible tube to the holder. The method may also include lifting the container to flush out air or air bubbles in the flexible tube or the connector. The method may further include dislodging debris that clogs a jagged open end of the flexible tube.

The fluid level in the container may be maintained by adding fluid to the container when the fluid level in the container approaches the opening of the container or the upper mark on the container.

The frequency for adding fluid or water may vary with plant size, holder size, types of fresh cut plant, environment, or location. The frequency for adding fluid or water may generally be longer with smaller plants, larger holders, plants that have been cut for longer, and cooler locations.

The device may be maintained by daily, or once every two days, or twice daily lifting the container to flush out air bubbles in the flexible tube or around the connection of the flexible tube to the container, and/or to dislodge debris that may clog the jagged open end of the flexible tube.

The device can be disconnected by removing the jagged open end of the flexible tube from the holder and holding the jagged open end above the water level in the container. When the jagged open end of the flexible tube is kept above the water level in the container, the container and the flexible tube can be moved to a different location to empty the water from the container.

Solving Problems Associated with Conventional Christmas Tree Stands

Many holders for a cut plant can hold a small volume of fluid and would need frequent addition of fluid, such as water. The water may also be added with a preservative, a plant nutrient, and/or anti-microbial agent. The longevity of the cut plant in the holder decreases if the bottom of the cut plant loses contact with the water in the holder.

The space for useful water in the conventional Christmas tree stand or a holder is reduced due to (i) the space taken by the tree trunk, (ii) the holes lower than the top of the stand, (iii) the central element which raises the Christmas tree above the bottom of the tree stand, and (iv) the cut bottom of the Christmas tree is rarely perfectly straight. Many Christmas tree stands have a central element that assists in securing the tree in the stand. This central element engages with the cut bottom of the tree and keeps the cut bottom of the tree off the bottom of the stand, which means that the Christmas tree does not have access to all the water in the stand. The central element is usually 0.5 inch or taller. For conventional Christmas tree stands that are 3 to 6 inches tall, the 0.5 inch means that 8% to 16% of the total volume of liquid in the stand is not accessible to the Christmas tree. For example, a conventional stand that is about 6 inches tall and 5.5 inches in diameter can hold approximately 2.5 quarts of water. However, when the conventional stand has the central element that is 0.5 inches tall, holes that are 0.5 inches below the top of the stand, and a tree with a trunk that is 4 inches in diameter, the amount of useful water in the stand is reduced to approximately 1 quart.

Aside from the immediate lack of water, air can enter into stems or trunks of the cut plants, such as Christmas trees. The air can further prevent water from entering the stems or trunks of the cut plants.

Further, the Christmas tree stands are normally not transparent such that it is not visible to view the water level in the stands. Thus, to determine if a Christmas tree stand needs additional water, one may place a finger or other device into the stand to determine the water level. During filling the stand with water, one needs to keep the finger in the stand to determine the water level and to prevent water spillage from overflowing the top or leaking out from side holes of the stand.

The conventional Christmas tree stands have many inconveniences. For example, each water level check and/or addition usually requires one or more of the awkward and/or undesirable steps of (i) kneeling down and removing packages, (ii) maneuvering under the tree while avoiding ornaments, lights, needles and sap, and avoiding breaking branches and breaking ornaments, (iii) putting a finger in the stand to check water level, (iv) in the under the tree position bringing a water vessel to the tree stand, (v) with finger in the stand using other hand to raise vessel over the lip of the stand and add water, (vi) cleaning up spilled water, (vii) avoiding ornaments, lights, needles, and sap and avoiding breaking branches and breaking ornaments maneuvering out from under the tree, and (viii) adjusting disrupted ornaments, replacing packages, cleaning up dislodged needles from the floor and removing sap and needles from clothes and hair.

With the above inconveniences, relatively small useful water volume in a stand, and the speed that cut Christmas trees can consume water, the conventional tree stands often do not contain sufficient water for the tree. The tree's needles may dry out. This can be hazardous.

Additionally, the conventional Christmas tree stand may also include holes on its side walls. The holes are not watertight.

The disclosure provides a solution to solving the problems associated with monitoring water level and maintaining water in a holder for a cut plant. The disclosure provides a device to conveniently allow maintaining a supply of fluid to a cut plant in the holder without frequent attention. The device is easy to set up, able to visualize fluid levels, convenient to add fluid, and reliable to operate with reduced chances of water spilling or leaking.

As the device and the stand are on the same surface and connected by a flexible tube filled with fluid, the fluid level will be the same in both, when there are no air blocks. Thus, the visible fluid level in the device indicates the not visible fluid level in the stand, which allows the water level in the holder/stand to be easily monitored to know when to add more fluid and how much fluid to add to the container. This makes it easy to monitor the water level in the tree stand, which is often nontransparent and not visible.

The water level is visible in the container. One can monitor the water level in the container and ensure that the water level would not exceed the upper mark on the container, which helps assure that no water leak would occur from the side holes of the holder.

It is also easy to add more water to supply to the holder by filling water to the container rather directly filling water in the holder. There are reduced hassles involved for using the disclosed device.

Examples

The following examples are for illustrative purposes only. It will be apparent to those skilled in the art that many modifications, both to materials and methods, may be practiced without departing from the scope of the disclosure.

Figure 4A:
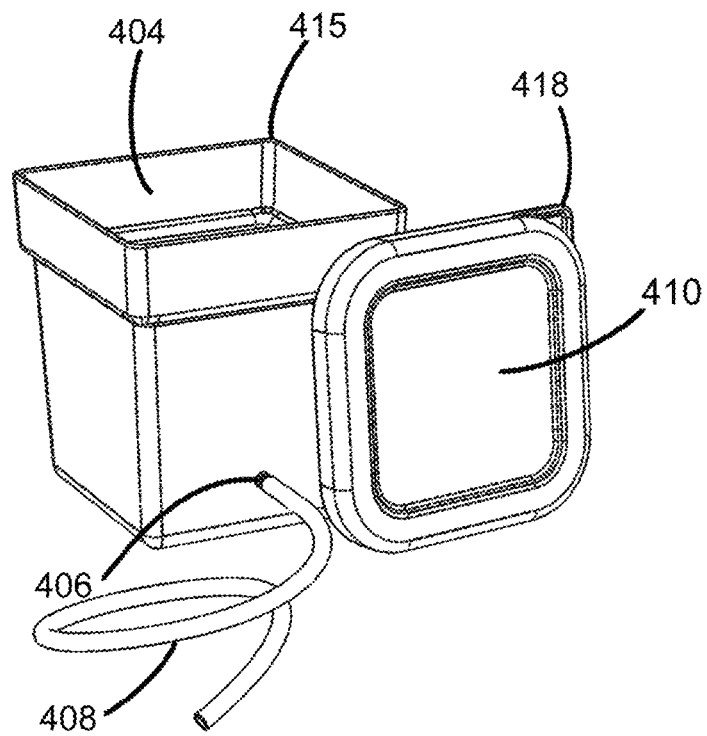
FIG. 4A is an image of a device including a container, having a lid, connected to a flexible tube, in accordance with an illustrative embodiment.

Devices may be made from plastic. FIG. 4A is an image of a device including a container, having a lid, connected to a flexible tube in accordance with an embodiment of the disclosure. As shown, a device includes a plastic container 404, a plastic flexible tube 408, a plastic connector 406, and a nontransparent plastic lid 410. The plastic container 404 is semi-transparent such that a water level in the container is visible from outside. The plastic flexible tube 408 is semi-transparent.

Figure 4B:
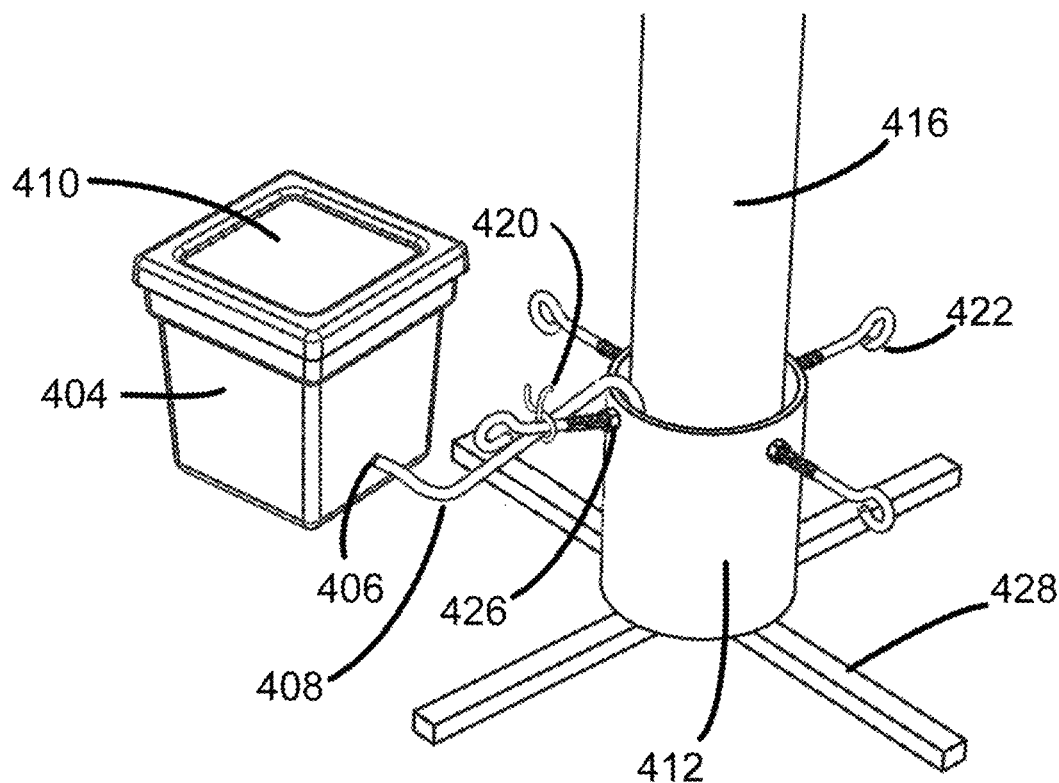
FIG. 4B is an image of the device of FIG. 4A in use with a holder (in this case a tree stand), in accordance with an illustrative embodiment.

FIG. 4B is an image of the device of FIG. 4A in use with a tree trunk holder in accordance with an embodiment of the disclosure. The container 404 is placed near a tree trunk stand 412, which holds a tree trunk 416 which is secured by using fasteners 422 through side holes 426. The plastic container 404 has a top edge 415, which can be covered by the lid 410. The lid 410 includes a handle portion 418 by a corner. The handle portion 418 can be used to remove the lid to open the container. Also, the flexible tube 408 is secured to the fastener 422 by a fastener, optionally a flexible fastener (e.g., twist tie 420, zip tie, rope, wire, cable, hook-and-loop fastener). Further, an element 428 for supporting the tree trunk stand 412 extends outside the stand 412 from the bottom of the stand 412.

Figure 5:
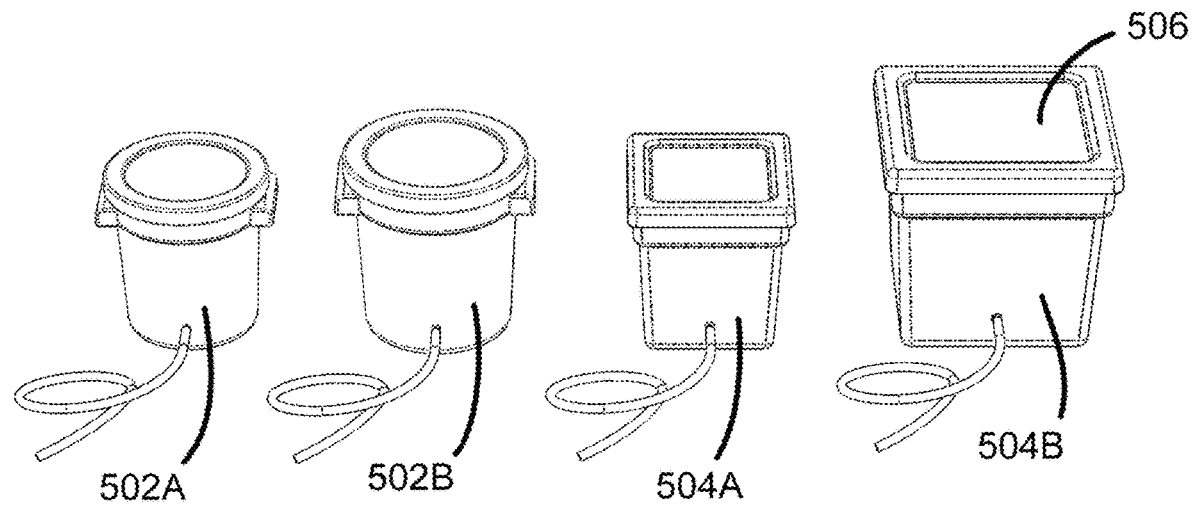
FIG. 5 is an image of various shaped and sized containers, in accordance with an illustrative embodiment.

FIG. 5 is an image of various shaped and sized containers in accordance with an embodiment of the disclosure. As shown, the containers 502A-B are buckets of different sizes and have cylindrical side walls. The lids of the containers 502A-B are translucent. The containers 504A-B have rectangular side walls and are different sizes. The lids of the containers 504A-B are not translucent.

The disclosed device allows more fluid capacity than a conventional Christmas tree stand alone and may, if the flexible tubing is plugged in a watertight manner and/or the open end of the tubing is held above the top of the container, be watertight when placed upright on a flat surface. With the disclosed device, the cut plant can be watered to avoid hassles which one may encounter when using a conventional holder or stand for a Christmas tree. For example, the conventional holder or stand allows access to the stand from beneath the tree, which may require a person to crawl under the tree to access the stand. The person may have to deal with sharp needles and sap when filling the stand with fluid. Also, ornaments and lights may be dislodged and even break. Further, presents, gifts or decorations may be moved prior to adding fluid to the Christmas tree stand.

The device is set up by (i) optionally comparing the container to the side holes of the holder and marking the top water level of the holder on the exterior of the container, (ii) securing the flexible tube to the container in a water tight manner, which may also be completed by the manufacturer before shipping, (iii) placing the jagged open end of the flexible tube at the bottom of the holder, (iv) optionally securing a portion of the flexible tube to the holder or to the cut plant, (v) adding water to the container, (vi) lifting the container until water flows through the flexible tube over the edge of the holder, (vii) placing the container back down such that the bottom of container is at same level as bottom of the holder, which ensures that the water level in the holder and container are at the same level, and (viii) as needed, refilling the container with water to the optional mark made in step (i).

When the device is properly set up, atmospheric pressure or Pascal's principle ensures that the fluid level in the container is the same as the fluid level in the holder. As the fluid levels are the same, the fluid level in the container can be monitored to know when to add more fluid and how much fluid to add to the container. This makes it easy to monitor the fluid level in the holder, which is nontransparent and not visible from outside.

Figure 6A:
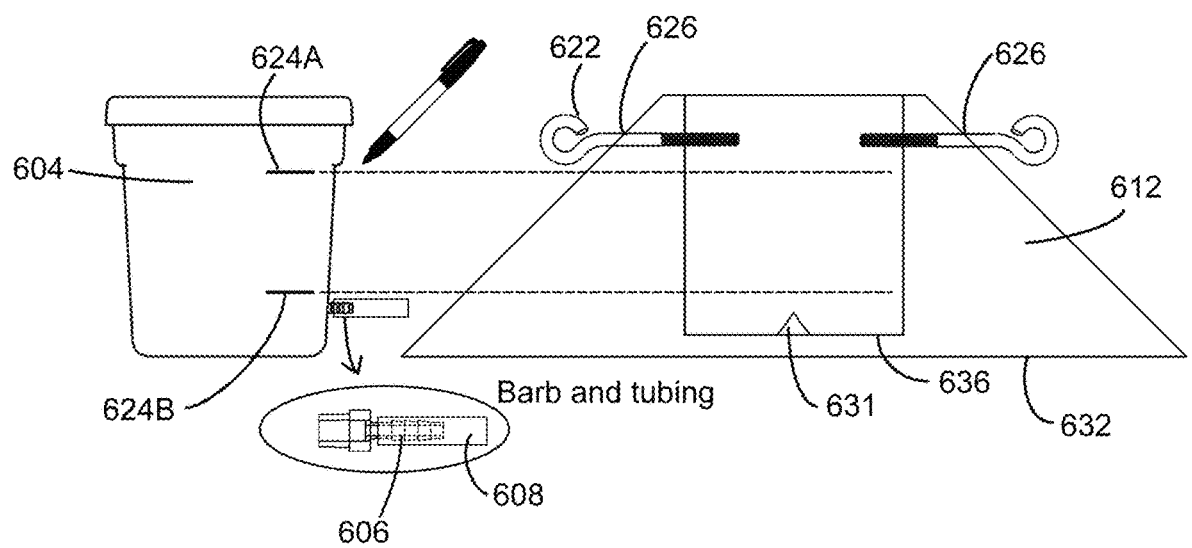
FIG. 6A is a diagram illustrating a first step of marking water levels to a container of a device, in accordance with an illustrative embodiment.

In the use of the device with a cut Christmas tree, find the Christmas tree stand, and a pen or marker. In an optional first step, place a tree stand 612 and a container 604 side by side on a flat surface. FIG. 6A is a diagram illustrating marking water levels to a container of a device in accordance with an embodiment of the disclosure.

An upper mark 624A and a lower mark 624B are drawn on the side wall of the container 604. The upper mark 624A may be about half an inch below a position for side holes 626 on the stand 612 to avoid water leak from side holes 626 of the stand 612. One or more fasteners 622 can be placed through the side hole 626 to secure a tree trunk in the stand 612.

The lower mark 624B is aligned with or up to half an inch above a central element 631 in the stand 612. The cut bottom 628 of the tree usually sits on a central element 631 that is above the base 636 of the stand 612. The lower mark 624B cannot be below the opening of the container where the connector 606 engages with the container 604. The fluid level in the container 604 should not be below the lower mark 624B to avoid air bubbles trapped into the flexible tube 608 (refer to, e.g., FIG. 6B). Optionally, one may put tape or other materials on the container as the water marks 624A-B. The lower mark 624B may provide a visual indication of when fluid needs to be added to the container 604. For example, when the fluid level is near or at the lower mark 624B, fluid should be added to provide necessary fluid to the stand/holder and to avoid air bubbles becoming trapped into the flexible tube 608.

Figure 6B:
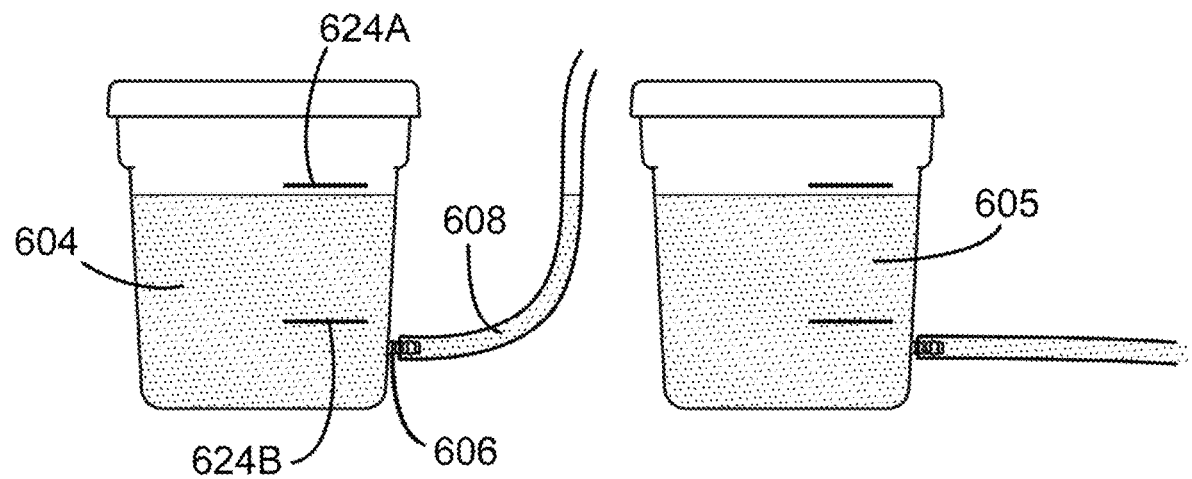
FIG. 6B is a diagram illustrating a second step of ensuring no water leaking from the container and a connector to a flexible tube of the device, in accordance with an illustrative embodiment.

The device including the container, the connector, and the flexible tube are fabricated to be watertight when the container is placed upright on a flat surface and the flexible tubing is plugged in a watertight manner and/or the open end of the tubing is held above the top of the container. FIG. 6B is a diagram illustrating an optional second step of ensuring no water leaking from the container in accordance with an embodiment of the disclosure. The optional second step is to check if the device has any leaks by placing the container in a sink, raising an open end of a flexible tube 608 above the upper mark 624A and filling the container 604 with water 605 (refer to, e.g., FIG. 6D) to the upper mark 624A. One can check for leaks near a connector 606 between the flexible tube 608 and the container 604. One can lower the flexible tube 608 below the upper mark 624A to check if water can flow easily through the flexible tube 608. Then, one can empty the water 605 from the container 604.

Figure 6C:
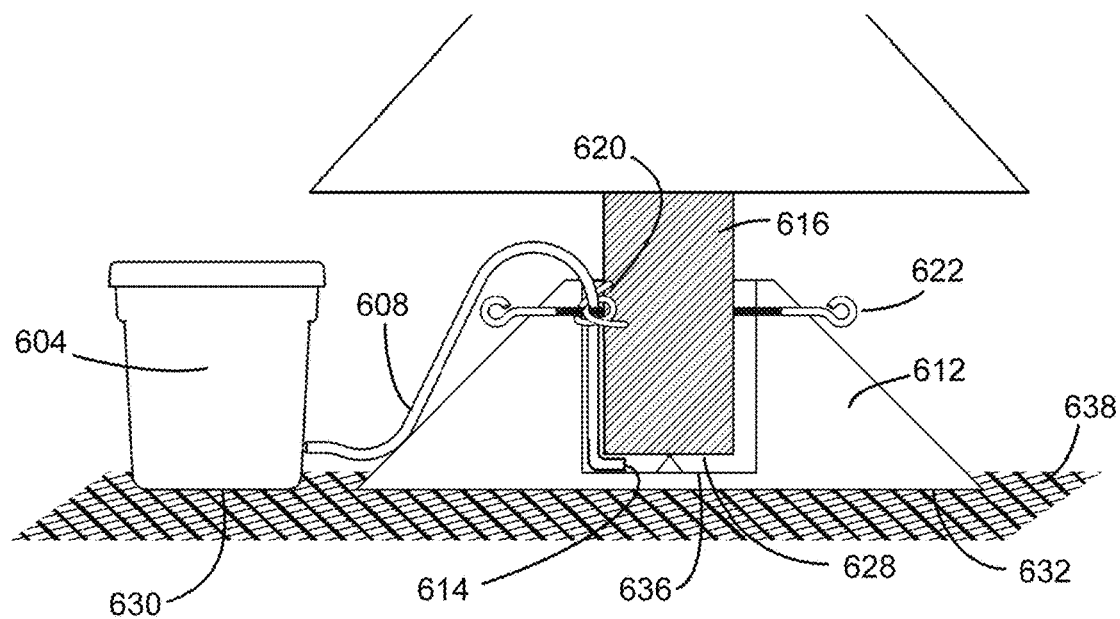
FIG. 6C is a diagram illustrating a third step of securing the flexible tube of the device to the holder, in accordance with an illustrative embodiment.

FIG. 6C is a diagram illustrating the third step of putting the flexible tube 608 into the stand 612 in accordance with an embodiment of the disclosure. Kinks are removed from the flexible tube 608. Once the tree trunk 616 is placed in the stand 612 and properly aligned, the container can be placed near the stand 612 on the flat surface 638 (likely a floor). As such, a bottom 630 of the container 604 is placed at the same level as a bottom 632 of the stand 612. One can slide a jagged open end 614 of the flexible tube 608 into the stand 612 until the jagged open end is below the bottom 628 of the tree trunk 616. The open end of the tube does not point up. Optionally, a fastener, optionally a flexible fastener (e.g., twist tie 620, zip tie, rope, wire, cable, hook-and-loop fastener) can secure the flexible tube 608 to the fastener 622 secured to the stand 612 without pinching or bending the tube 608. The fastener may prevent and/or retard the flexible tube 608 from becoming unsecured from the stand 612 due to, for example, curious animals, small children, adjusting presents or moving the container 604, which could disadvantageously cause the open end of the flexible tube 608 to be exposed to air, fluid to stop flowing and the cut plant to begin to dry out, the flexible tube 608 to begin to dry out, and/or the flexible tube 608 to dislodge from the stand 612 and fluid to begin to flow onto the floor.

Figure 6D:
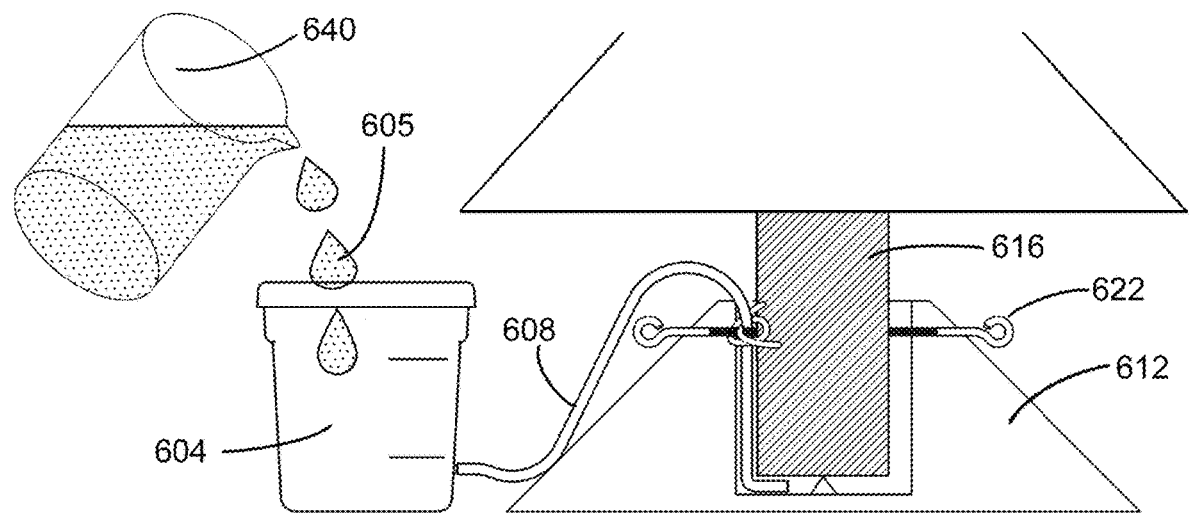
FIG. 6D is a diagram illustrating a fourth step of filling water in the container and starting water flow to the holder, in accordance with an illustrative embodiment.
Figure 6D:
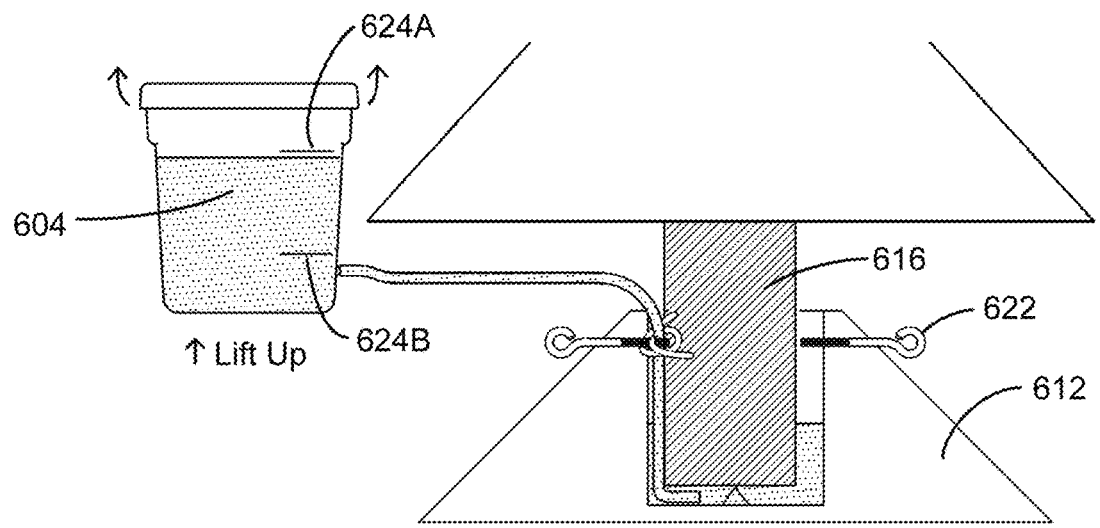

FIG. 6D is a diagram illustrating the fourth step of adding fluid to the container and starting fluid flow to the stand in accordance with an embodiment of the disclosure. The fourth step is to fill the container 604 by pouring fluid 605 (e.g., from a pitcher 640) until the fluid 605 reaches to the upper mark 624A. To start fluid flowing, one can lift and hold the container 604 about 5 to 6 inches off the floor. After the water level in the container 604 drops about an inch, the container 604 can be put down. After a minute or two, the container 604 can be refilled to the upper mark 624A (e.g., by using the pitcher 640). The fluid level in the container 604 goes down when fluid 605 flows into the stand 612. A lid 610 can then be put on the container 604.

Figure 6E:
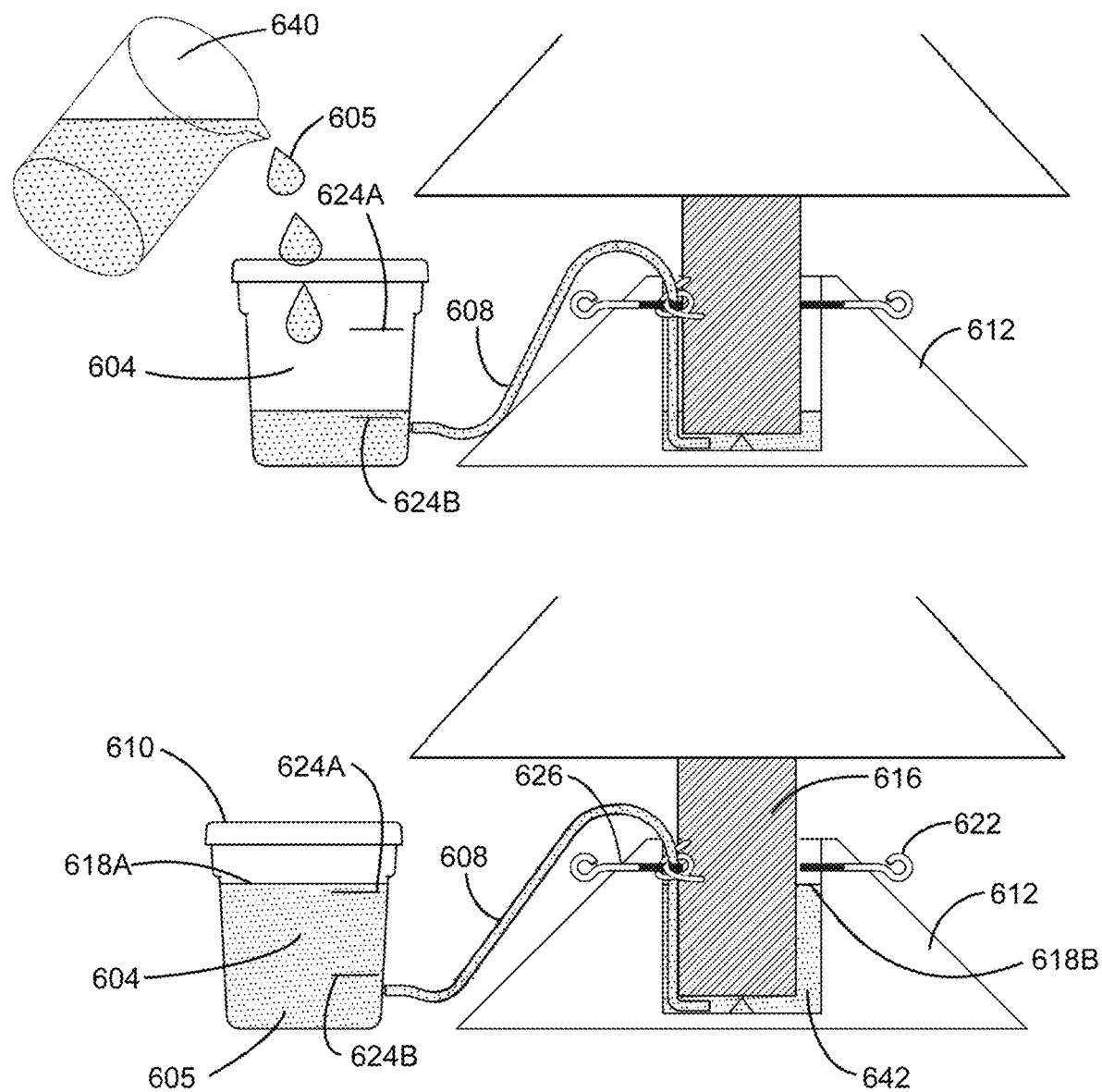
FIG. 6E is a diagram illustrating a fifth step of replenishing water to the container so as to maintain the water in the holder at the same level as the container, in accordance with an illustrative embodiment.

FIG. 6E is a diagram illustrating a fifth step of replenishing fluid to the container 604 so as to maintain the fluid in the stand 612 at the same level as the container in accordance with an embodiment of the disclosure. The fifth step is to replenish fluid 642 in the stand to keep the tree trunk 616 hydrated. As shown, the level of fluid 605 is filled to an upper surface 618A in the container 604, which is slightly below the upper mark 624A on the container. As shown, the water level 618A in the container 604 becomes the same as the water level 618B in the stand 612. The water level 618B is below the side holes 626 of the stand to prevent from water leak through the side holes 626.

One may lift up the container (having water near the upper mark) 5 to 6 inches above the floor for a few seconds, which forces water through the tube and discourages air gaps from blocking the water flow to the stand.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A device for supplying a fluid to cut plants, the device comprising:
   a container comprising a base and a surrounding wall extending from the base to define an enclosed space or cavity for holding the fluid;
   a connector coupled to the container; and
   a flexible tube coupled to the connector, wherein the flexible tube comprises a jagged open end, and wherein the connector enables a fluid communication between the container and the flexible tube,
   wherein the surrounding wall comprises an opening configured to connect to the flexible tube by the connector, and
   wherein a center of the opening for the connector is 0.25 to 2.0 inches above the base of the container.
2. The device of claim 1, wherein the jagged open end has a rough end surface.
3. The device of claim 1, wherein the container is optically transparent or semi-transparent or opaque.
4. The device of claim 1, wherein the container comprises a window portion for viewing a level of the fluid in the container.
5. The device of claim 1, wherein the container is a bucket.
6. The device of claim 1, wherein the surrounding wall comprising a square shape, a rectangular shape, or a cylindrical shape.
7. The device of claim 1, further comprising a lid that covers a top edge of the surrounding wall.
8. The device of claim 7, wherein the lid comprises a handle portion.
9. The device of claim 1, wherein the container comprises legs that support the base.
10. The device of claim 1, wherein the flexible tube has an inner diameter being at least equal to or greater than 0.125 inches.
11. The device of claim 1, wherein the connector comprises a spigot for controlling fluid flow.
12. The device of claim 1, wherein the connector comprises a first end portion being a barbed fitting for connecting to an end of the flexible tube.
13. The device of claim 12, wherein the connector comprises a second end portion for attaching to an opening of the container.
14. The device of claim 13, wherein the connector comprises an enlarged portion between the first end portion and the second end portion.
15. The device of claim 1, wherein the connector is a component separated from the container.
16. The device of claim 1, wherein the connector is an integral part of the container.
17. The device of claim 1, wherein the container comprises a handle portion.
18. A system comprising the device of claim 1, further comprising:
   a holder for a cut plant; and
   a twist tie to secure the flexible tube to the holder,
   wherein the holder and the container are placed on a same level of a flat surface,
   wherein the flexible tube extends downward into the holder to allow the fluid to flow from the container to the holder, such that a fluid level in the container is the same as a fluid level in the holder.
19. The system of claim 18, wherein the holder is a cut Christmas tree stand.
20. The device of claim 1, wherein the jagged open end has a notched end surface.
21. The device of claim 1, wherein the jagged open end has an undulating end surface.
22. The device of claim 1, wherein the jagged open end has a non-planar end surface.
23. A method of supplying fluid to a cut plant in a holder, comprising:
   placing a container and a holder containing a cut plant on a flat surface;
   extending a flexible tube from a sidewall of the container into the holder to a position below a bottom of the cut plant, wherein the flexible tube comprises a jagged open end;
   facilitating a fluid flow from the container to the holder through the flexible tube;
   maintaining a fluid level in the holder to be the same as a fluid level in the container; and
   securing the flexible tube to the holder.
24. The method of claim 23, wherein the step of maintaining the fluid level in the holder comprises filling fluid in the container up to an upper mark on the container, wherein the upper mark is below a top and any side holes of the holder.
25. The method of claim 24, wherein the step of maintaining the fluid level in the holder comprises monitoring the fluid level in the container and adding fluid to the container to maintain the fluid level above a lower mark on the container.
26. The method of claim 25, wherein the lower mark is above an opening on a side wall of the container, wherein a connector fits into the opening of the container.
27. The method of claim 23, further comprising:
   lifting the container to flush out air bubbles in the flexible tube; and
   dislodging debris that clogs an open end of the flexible tube, the jagged open end having a rough end surface.
28. A device for supplying a fluid to cut plants, the device comprising:
   a container comprising a base and a surrounding wall extending from the base to define an enclosed space or cavity for holding the fluid;
   a connector coupled to the container; and
   a flexible tube coupled to the connector, wherein the flexible tube comprises a jagged open end, and wherein the connector enables a fluid communication between the container and the flexible tube,
wherein the connector comprises a spigot for controlling fluid flow.

29. The device of claim 28, wherein the surrounding wall comprises an opening configured to connect to the flexible tube by the connector.

30. The device of claim 28, wherein the flexible tube has an inner diameter being at least equal to or greater than 0.125 inches.

31. The device of claim 28, wherein the connector comprises a first end portion being a barbed fitting for connecting to an end of the flexible tube.

32. The device of claim 31, wherein the connector comprises a second end portion for attaching to an opening of the container.

33. The device of claim 32, wherein the connector comprises an enlarged portion between the first end portion and the second end portion.

34. The device of claim 28, wherein the connector is a component separated from the container.

35. The device of claim 28, wherein the connector is an integral part of the container.

36. The device of claim 28, wherein the container comprises a handle portion.

37. The device of claim 28, wherein the jagged open end has a notched end surface.

38. The device of claim 28, wherein the jagged open end has an undulating end surface.

39. The device of claim 28, wherein the jagged open end has a non-planar end surface.

40. A system comprising the device of claim 28, further comprising:
a holder for a cut plant; and
a twist tie to secure the flexible tube to the holder,
wherein the holder and the container are placed on a same level of a flat surface,
wherein the flexible tube extends downward into the holder to allow the fluid to flow from the container to the holder, such that a fluid level in the container is the same as a fluid level in the holder.

41. The system of claim 40, wherein the holder is a cut Christmas tree stand.

42. A device for supplying a fluid to cut plants, the device comprising:
a container comprising a base and a surrounding wall extending from the base to define an enclosed space or cavity for holding the fluid;
a connector coupled to the container; and
a flexible tube coupled to the connector, wherein the flexible tube comprises a jagged open end,
wherein the connector enables a fluid communication between the container and the flexible tube, and
wherein the connector is a component separated from the container.

43. The device of claim 42, wherein the surrounding wall comprises an opening configured to connect to the flexible tube by the connector.

44. The device of claim 42, wherein the flexible tube has an inner diameter being at least equal to or greater than 0.125 inches.

45. The device of claim 42, wherein the connector comprises a first end portion being a barbed fitting for connecting to an end of the flexible tube.

46. The device of claim 45, wherein the connector comprises a second end portion for attaching to an opening of the container.

47. The device of claim 46, wherein the connector comprises an enlarged portion between the first end portion and the second end portion.

48. The device of claim 42, wherein the connector is an integral part of the container.

49. The device of claim 42, wherein the container comprises a handle portion.

50. The device of claim 42, wherein the jagged open end has a notched end surface.

51. The device of claim 42, wherein the jagged open end has an undulating end surface.

52. The device of claim 42, wherein the jagged open end has a non-planar end surface.

53. The device of claim 42, wherein the connector comprises a first end portion being a barbed fitting for connecting to an end of the flexible tube.

54. The device of claim 53, wherein the connector comprises a second end portion for attaching to an opening of the container.

55. The device of claim 54, wherein the connector comprises an enlarged portion between the first end portion and the second end portion.

56. A system comprising the device of claim 42, further comprising:
a holder for a cut plant; and
a twist tie to secure the flexible tube to the holder,
wherein the holder and the container are placed on a same level of a flat surface,
wherein the flexible tube extends downward into the holder to allow the fluid to flow from the container to the holder, such that a fluid level in the container is the same as a fluid level in the holder.

57. The system of claim 56, wherein the holder is a cut Christmas tree stand.

58. A device for supplying a fluid to cut plants, the device comprising:
a container comprising a base and a surrounding wall extending from the base to define an enclosed space or cavity for holding the fluid;
a connector coupled to the container; and
a flexible tube coupled to the connector, wherein the flexible tube comprises a jagged open end,
wherein the connector enables a fluid communication between the container and the flexible tube, and
wherein the jagged open end has an undulating end surface.

59. The device of claim 58, wherein the surrounding wall comprises an opening configured to connect to the flexible tube by the connector.

60. The device of claim 58, wherein the flexible tube has an inner diameter being at least equal to or greater than 0.125 inches.

61. The device of claim 58, wherein the connector is a component separated from the container.

62. The device of claim 58, wherein the connector is an integral part of the container.

63. The device of claim 58, wherein the container comprises a handle portion.

64. The device of claim 58, wherein the jagged open end has a notched end surface.

65. The device of claim 58, wherein the jagged open end has a non-planar end surface.

66. A system comprising the device of claim 58, further comprising:
a holder for a cut plant; and
a twist tie to secure the flexible tube to the holder, wherein the holder and the container are placed on a same level of a flat surface, wherein the flexible tube extends downward into the holder to allow the fluid to flow from the container to the holder, such that a fluid level in the container is the same as a fluid level in the holder.

67. The system of claim 66, wherein the holder is a cut Christmas tree stand.

\* \* \* \* \*